United States Patent [19]

Brown et al.

[11] Patent Number: 4,470,863
[45] Date of Patent: Sep. 11, 1984

[54] METHOD AND MEANS FOR MAINTAINING ELECTRICAL ISOLATION OF DISSIMILAR METALS WHEN CUTTING OR DRILLING IS REQUIRED

[75] Inventors: William D. Brown, Riverside County; Ross E. Veta, San Diego County, both of Calif.

[73] Assignee: Rohr Industries, Inc., Chula Vista, Calif.

[21] Appl. No.: 525,469

[22] Filed: Aug. 22, 1983

[51] Int. Cl.³ .................... B32B 31/18; B32B 31/14; B32B 31/22
[52] U.S. Cl. .................... 156/250; 156/252; 156/253; 156/292; 156/278; 156/280
[58] Field of Search ............ 156/253, 252, 292, 330, 156/87, 250, 280, 278; 52/145; 29/163.5 R, 22, 33.5, DIG. 1; 181/284, 290, 244, 292, 293, 296, 286, 294; 428/596, 116, 118, 137, 193, 209, 247, 256; 427/356, 358, 410, 386, 388.1; 234/1, 2; 83/30, 922; 188/251 R, 251 A, 251 M

[56] References Cited

U.S. PATENT DOCUMENTS

| 3,536,557 | 10/1970 | Goldstone | 156/280 X |
| 4,048,366 | 9/1977 | Kingsbury | 428/215 |
| 4,235,303 | 11/1980 | Dhoore et al. | 428/116 X |
| 4,254,171 | 3/1981 | Beggs et al. | 156/292 X |
| 4,271,219 | 6/1981 | Brown | 156/292 X |
| 4,294,329 | 10/1981 | Rose et al. | 181/286 X |
| 4,318,453 | 3/1982 | Rose et al. | 52/145 X |
| 4,421,811 | 12/1983 | Rose et al. | 156/280 X |

Primary Examiner—Edward C. Kimlin
Assistant Examiner—Ramon R. Hoch
Attorney, Agent, or Firm—Patrick J. Schlesinger; Frank D. Gilliam

[57] ABSTRACT

In acoustic panels employing a layer of perforate metal adhesively bonded to a layer of porous fibrous metal of a different type with the perforations of the perforated layer and the pores of the porous fibrous layer open to communication therethrough and the layers being isolated therebetween. The isolation between the layers is maintained by applying a coating of liquid epoxy resin material to selected locations, curing the epoxy coating, cutting or drilling the layers as required, and recoating the cut or drilled areas with a second coating of liquid epoxy resin.

2 Claims, 9 Drawing Figures

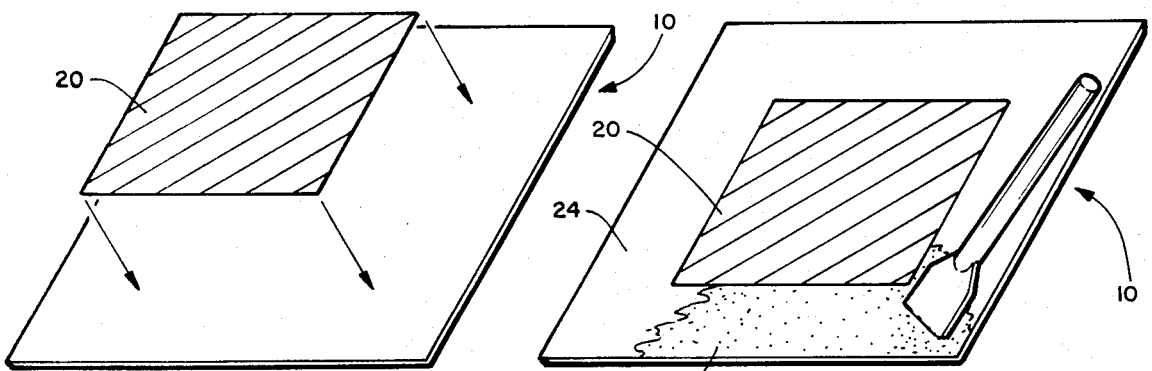
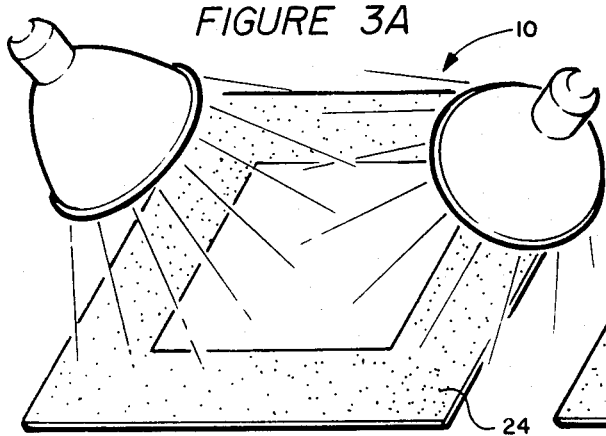
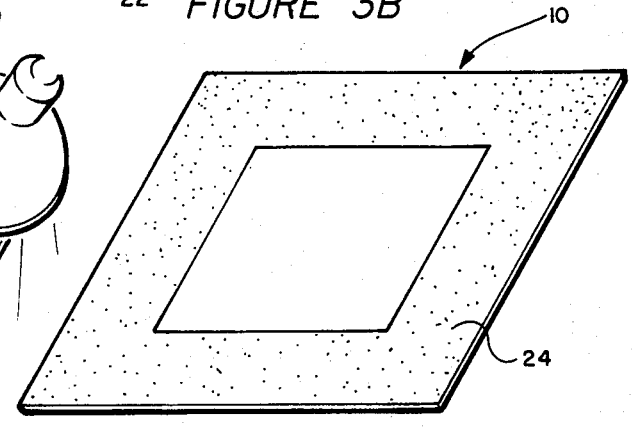
FIGURE 3A  FIGURE 3B
FIGURE 3C  FIGURE 3D
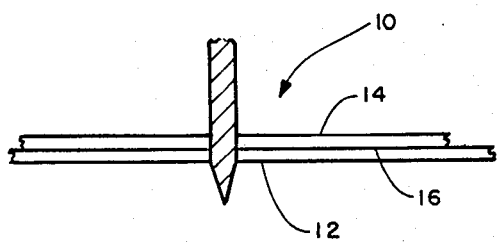
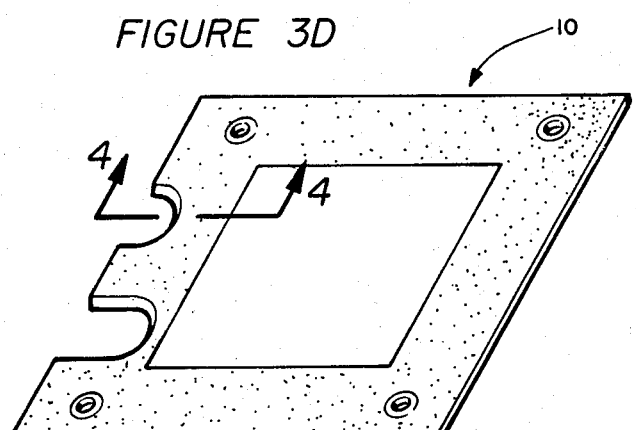
FIGURE 3E  FIGURE 3F
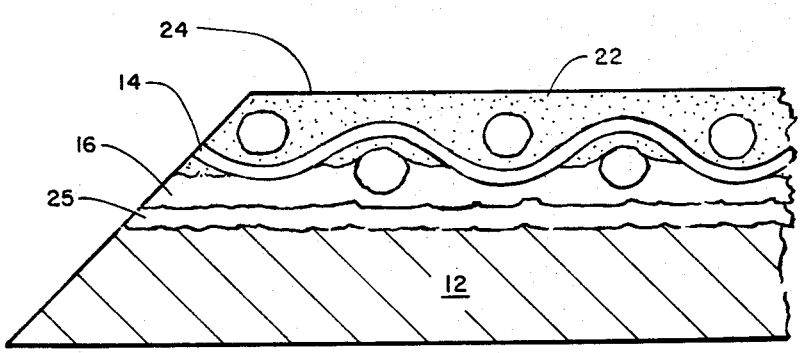
FIGURE 4

METHOD AND MEANS FOR MAINTAINING ELECTRICAL ISOLATION OF DISSIMILAR METALS WHEN CUTTING OR DRILLING IS REQUIRED

BACKGROUND OF THE INVENTION

This invention relates to an improvement in acoustic materials, and more particularly but not by way of limitation, to acoustic materials which have a perforated layer of first metal adhesively bonded to a porous fibrous layer of a second metal and where the maintaining of electrical isolation therebetween is critical.

In the manufacturing of sound attenuation or acoustic material it is desirable to bond perforated sheet material of a first metal such as aluminum to microporous fibrous material made from a second metal such as stainless steel or the like. A problem frequently encountered is galvanic action between the adjacent dissimilar metals which eventually may cause their destruction. This is generally called "dissimilar metal reaction".

Attempts have been made to provide this necessary electrical isolation and yet maintain the desired flow through resistance to sound through the perforations of the perforated sheet and the pores of the porous fibrous material. A common method is to carefully select the proper type adhesive so that it performs both functions. Another method is to "layer" the selected adhesive by partially curing a first layer, adding a second layer and so on. Both of these methods, while successful in isolating the layers of dissimilar metal to preclude galvanic action and providing a predetermined flow through resistance were found to be inadequate, at least partially, when cutting the combined composite structure to proper size or drilling through the combined layers of metal. Cutting or drilling caused either an instantaneous breakdown of the isolation between the layers or caused a breakdown later when the material was in actual use. The breakdown of the physical isolation and concomitant breakdown of the electrical isolation then results in unacceptable destructive galvanic action between the two metallic layers.

One method for maintaining isolation is now employed with some success. This method employs the use of strips of non-metallic cloth applied between the adjacent metal layers during their fabrication along with the layer or layers of adhesive. This method was successful in maintaining isolation between the metal layers where cutting and drilling was required. The result, however, has several drawbacks in practice, namely, the locations to be cut and drilled have to be predetermined during construction and therefore the material could not be used later where different cutting and drilling locations are desired after construction of the acoustic panel, also the porous fibrous metallic material has irregular surfaces where the cloth was located which causes turbulence to air flow thereacross when in use, and the application of the cloth was very labor intensive.

SUMMARY OF THE INVENTION

It is the primary object of this invention to provide an improved method of maintaining the electrical isolation between a perforated sheet and a porous fibrous sheet of dissimilar metals having a predetermined flow through characteristics when adhesively bonded together.

Another object of the invention is to maintain the normal electrical isolation between perforated and porous fibrous sheets of acoustic material after they are bonded together when cutting or drilling operations are performed in selected areas.

A still further object of the invention is to maintain the normal electrical isolation between combined metallic perforated and porous fibrous sheets of acoustic material at selected locations immediately prior to their selected application.

These and other objects and advantages of the invention will become better understood by reference to the following detailed description when considered together with the accompanying drawings.

BRIEF DESCRIPTION OF THE DRAWINGS

FIGS. 3A–3F pictorially illustrates the steps of the method of the present invention.

FIG. 4 is a showing illustrating a greater enlargement of the section taken along line 4—4 of FIG. 3F.

DETAILED DESCRIPTION OF THE PREFERRED EMBODIMENT OF THE INVENTION

Figure 1:
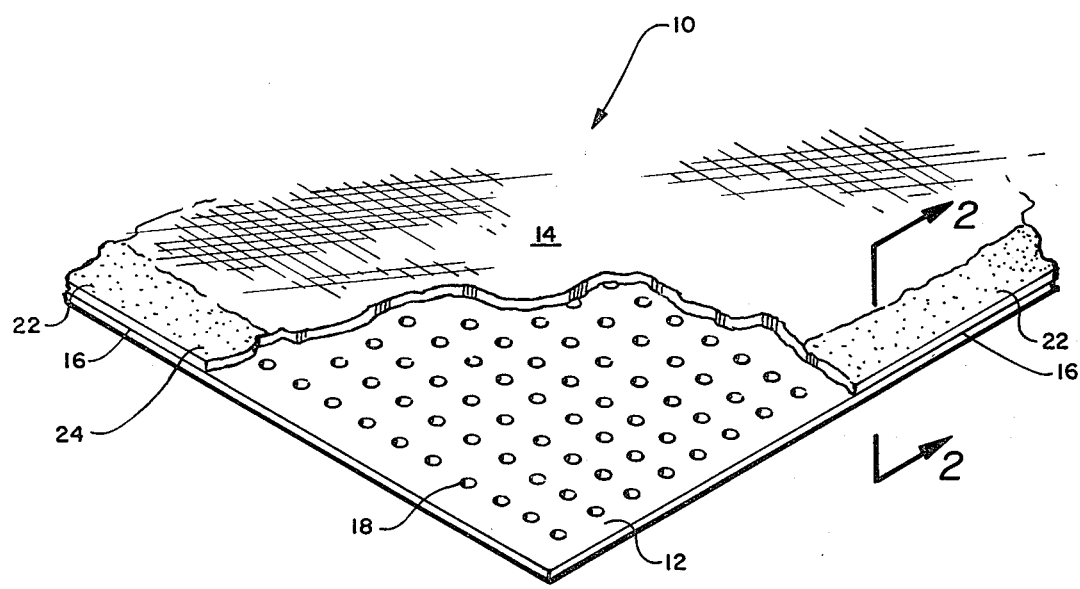
FIG. 1 depicts a partial cutaway pictorial view of adhesively bonded perforate and porous fibrous sheets.
Figure 2:
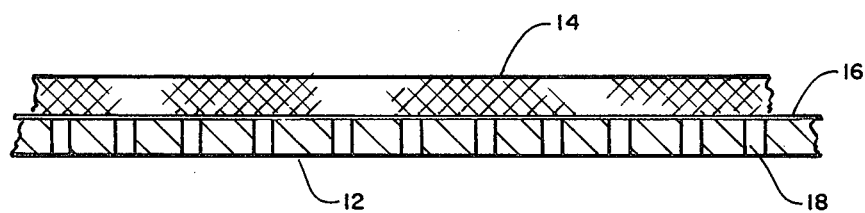
FIG. 2 is an enlarged structural section taken along line 2—2 of FIG. 1.

Referring now to the various figures in detail, and in particular to FIG. 1, the reference character 10 generally designates an attenuation structure comprising a perforated facing sheet 12 and a sheet of microporous fibrous material 14 bonded together by a selective adhesive along bond line 16.

The sheet of metallic microporous fibrous material 14, may comprise for example felt or any other of a number of various types of fibrous material, including stainless steel or the like. For some applications, as in the preferred embodiment, a woven wire material, such as dutch twill or the like is preferred.

The perforated facing sheet 12 is perforated with a plurality of small perforations 18, their size, for example, ranging from 0.035 to 0.065 inches in diameter. The perforations 18 provide a range of from 10% to 50% of actual open area to the perforated sheet 12. The perforations may be punched, drilled, or chem milled through the sheets.

A layer of a suitable primer 25 (see FIG. 4) is coated onto the perforated sheet 12 and cured for a predetermined period of time as is well known in the art.

A sheet of porous fibrous metallic material 14 is adhesively bonded by a layer of adhesive 16 to one surface of the perforated sheet 12. The adhesive 16 generally consists of a low solid solvent solution. When the solvent is removed from these adhesive solutions by evaporation the viscosity index of the remaining adhesive is elevated. An example of an adhesive that has been successfully used in the practice of the present invention is the adhesive having the trademark AF-31 manufactured by the 3M company.

The adhesive 16 for bonding the perforated sheet to the porous woven material is preferably applied by spraying onto the primed perforated sheet surface to be bonded a thin layer of the aforementioned adhesive. The solvent from the adhesive is then removed by evaporation. The surface attraction forces cause each perforation to take a smooth rounded funnel like form when the solvent is removed.

The now substantially solid or highly viscous adhesive layer remaining retains that funnel like form or shape, and later during the final cure cycle it softens sufficiently to adhere to the porous fibrous woven material. However, the adhesive viscosity is sufficiently high so that it does not wick laterally through the pores of the porous fibrous woven material. The thickness of the layer of adhesive is in the range of from 0.0005 to 0.005 of an inch. The layer of adhesive between the perforated sheet 12 and the sheet of porous fibrous woven material 14 obviously provides a layer of insulation or electrical isolation between these sheets thus preventing any interaction (galvanic) between the dissimilar metals of sheet construction.

The present invention provides continuous isolation between the assembled perforate sheet and the porous fibrous woven material where cutting for size and/or drill holes are required by applying a coating of a suitable liquid epoxy resin material 22 to the selected area or areas 24 of the fibrous material, allowing the area to cure after the resin has permeated a predetermined area of the material 14 and encapsulated individual fibers of such material, perform the cutting and/or drilling within such areas 24 and apply a second coat of the liquid epoxy resin as may be required to the selected area or areas 24.

METHOD OF MANUFACTURE

The initial step of the manufacturing process is to clean the perforate and porous fibrous woven material sheets to insure that all surfacants have been removed to insure satisfactory bonding.

One surface of the perforated sheet 12 is then coated with a suitable primer 25 (see FIG. 4) to improve the bonding that is cured prior to further processing. Care is to be taken to insure that the holes of the perforated sheet are not occluded or clogged in any respect.

The next step of the manufacturing process is to bond the porous fibrous material to one surface of the perforated sheet. As aforementioned the adhesive coating is preferably applied by spraying onto the surface of the perforated sheet a thin layer of the adhesive 16 at a desired thickness. If multiple coats are desired, then the major solvent fraction is removed between each successive layer of adhesive. The final layer has the solvent removed but is left uncured prior to the joining of the perforate sheet to the porous fibrous woven material. After the solvent from the last applied coat of adhesive is removed, the porous fibrous woven material is then placed on the coated surface and a positive force is applied between the two layers. Pressure may be applied by any well known means, such as, but not limited to, a press, autoclave or the like. The pressure used is generally in the range of 50 pounds per square inch.

After the bond between the perforated sheet 12 and porous fibrous material 14 is cured and it is desired to size the combined material 10 and/or to drill attachment apertures through the material 10 the following steps are performed. First, as shown in FIG. 3A, the area or areas where cutting or drilling of the material 10 is to be accomplished is masked off by any convenient means 20 such as a suitable masking tape so that only the desired area or areas 24 will be treated; secondly, as shown in FIG. 3B, the desired mask off area or areas 24 then receive a coating of a liquid epoxy resin 22. The epoxy resin may be applied by any convenient manner, such as brushing or the like. The coating of the epoxy resin should be sufficient to enable it to permeate the pores of the porous fibrous material 14 and the perforations 18 of sheet 12 to insure a good bond of the structure. A typical liquid epoxy resin used is EA-956, manufactured by DEXTER HYSOL. Any other type liquid epoxy resin having the same or similar characteristics can be used to practice this invention; The liquid epoxy resin is then cured according to the manufacturers specifications as per Fig. 3C;

The masking is then removed, as in FIG. 3D; The areas treated with the cured epoxy resin 22 are then cut and/or drilled, see FIG. 3E, as desired; The cut or drilled surfaces are then deburred and smoothed as required by conventional methods, see FIG. 3F; and the area 24 or areas cut and/or drilled are covered with a second coat of the liquid epoxy resin and allowed to cure as before to reencapsulate any portions of he material 10 that has been encapsulated and then exposed after the selective cutting or drilling operation had been performed. The finished product is now ready for ultimate use.

It is to be understood that what is accomplished by the resin coating 22 is the encapsulation of the individual fibers of the material and the coating of the perforations 18 in the selected areas 24. This in itself assists in maintaining electrical isolation between the layers 12 and 14 during desired mechanical processing by precluding electrical contact between portions of the two layers that may be forced together during such mechanical processing. Additionally however, the resin 22 provides a rigidity to the structure 10 in the area 24 so that the material 14 resists deformation and being forced into contact with the layer 12 during said mechanical processing such as drilling. An enlargement of the structure illustrating this concept of the invention is seen in FIG. 4.

It is to be noted that the porosity of the material 10 is severely impacted if not eliminated in area 24 by the application of the resin 22. Accordingly, the application of the resin 22 is preferably limited to the immediate vicinity of the hole or cut to be made in the material 10. For example, the area 24 need exceed the area of the cut or drill hole by only 0.125 inch for example. Quite obviously to avoid impacting the acoustic properties of the panel 10, one would limit the area 24 to the minimum that would permit the desired cutting or drilling to be performed without breaking down the electrical insulation between the layers 12 and 14.

It should be understood that the combined perforated sheet and sheet of porous fibrous material are used with other components to fabricate sound attenuation panels as described in U.S. Pat. Nos. 4,294,329, 4,318,453 and others. While the cutting and drilling operations are shown being performed prior to the sheet 10 being formed into an acoustic panel having honeycomb core therein the instant invention may be used with equal facility after final construction of the panel or before.

Although the foregoing invention has been described in some detail by way of illustration and example for the purpose of clarity of understanding, it should be understood that certain changes and modifications may be practiced within the spirit of the invention as limited only by the scope of the appended claims.

What is claimed as new and useful and desired to be secured by United States Letters Patent is:

1. A method of maintaining isolation between adjacent layers of dissimilar metals in selected locations where cutting for sizing and/or drilling of the combined layers is required, said layers including at least a layer of perforated first metal and an outer layer of porous fibrous second metal adhesively bonded to the layer of said perforated first metal in a manner that excludes adhesive in the perforated portions of the first metal layer and that provides insulation between the layers comprising the steps of:

masking at least a portion of the combined perforated sheet and porous fibrous metal prior to the application of liquid epoxy to define selected locations;

applying a coating of liquid epoxy resin material to selected locations of the porous fibrous second metal layer where cutting or drilling is to be accomplished whereby the liquid epoxy resin material permeates the fibrous material and flows into the perforations of the perforated layer to encapsulate the fibers in the porous fibrous metal layer and coat the perforations in the perforated metal layer in the selected locations;

curing the liquid epoxy resin to establish rigidity of the composite layer structure in such selected locations; and cutting or drilling through the epoxy coated locations as required.

2. The invention as defined in claim 1 comprising the additional step of recoating cut and/or drilled locations with a second coat of liquid epoxy material.

* * * * *